INVENTORS
BOHDAN HURKO
RAYMOND L. DILLS
BY Richard L. Caslin
THEIR ATTORNEY

# United States Patent Office 3,227,856
Patented Jan. 4, 1966

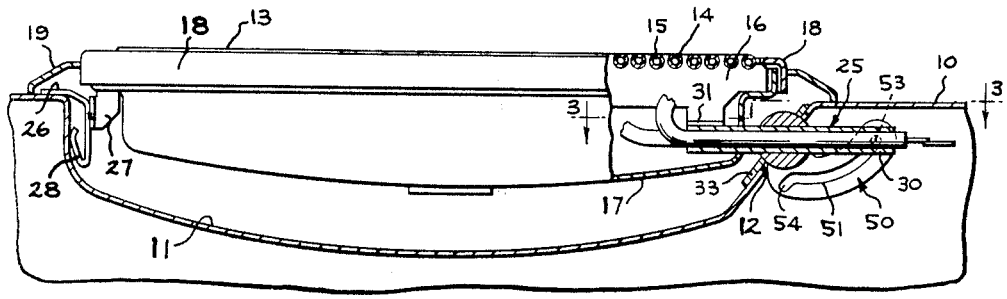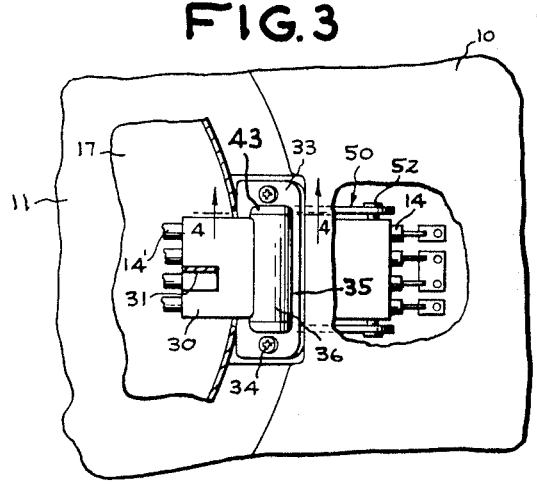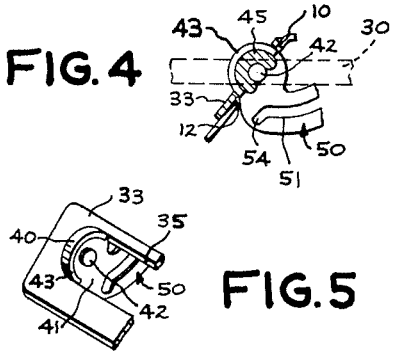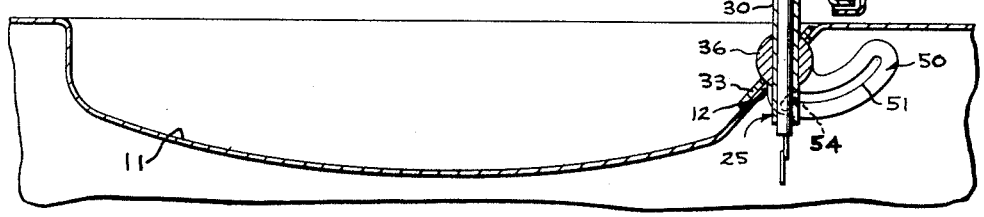
INVENTORS
BOHDAN HURKO
RAYMOND L. DILLS
BY Richard L. Caslin
THEIR ATTORNEY Jan. 4, 1966  B. HURKO ETAL  3,227,856
SURFACE UNIT HINGING MEANS FOR SPILL-PROOF COOKING SURFACE
Filed April 12, 1965  2 Sheets-Sheet 2

3,227,856
SURFACE UNIT HINGING MEANS FOR SPILL-PROOF COOKING SURFACE
Bohdan Hurko and Raymond L. Dills, Louisville, Ky., assignors to General Electric Company, a corporation of New York
Filed Apr. 12, 1965, Ser. No. 447,477
16 Claims. (Cl. 219—463)

The present invention relates to an electric surface heating unit having a resistance heating element that is supported on a top cooking surface over an imperforate recess in the cooking surface, and particularly to a novel hinging means for the heating unit of metallic or ceramic hard wearing parts which seals the terminals of the heating element from spillage in all angular positions of the hinge.

This application is a continuation-in-part application of our copending application Serial No. 255,761 which was filed on Feb. 4, 1963 and likewise assigned to the General Electric Company, the assignee of the present invention.

A standard electric range is provided with a top cooking surface having a plurality of large holes therethrough, each hole having positioned therein an annular reflector pan that also has large central opening. A resistance heating element is mounted across the top surface of the pan. A hinge means is also provided for each heating unit so that the unit may be pivoted to a raised position and the reflector pan removed so that the metal drip box located beneath the cooking surface may be maintained clean by being scrubbed periodically. One advantage in using the large holes in the cooking surface for receiving the heating unit is that only a small amount of heat is lost by heat transfer from the heating element to the cooking surface. One main disadvantage in using such holes is that food and especially liquids are liable to spill onto the reflector pan and drain out the bottom thereof into the metal drip box located under the cooking surface. It is a laborious tank to keep this drip box clean since it is difficult to reach all areas of the drip box through the openings, and the visibility within the box is poor. Moreover, the average housewife is unfamiliar with electricity and she hesitates allowing her arm to come into contact with the lead wires for the heating units which are strung across the drip box and beneath the cooking surface. Hence, a thorough cleaning job is difficult to obtain.

The principal object of the present invention is to provide a spill-proof hinging means for an electric heating unit for use with a spill-proof cooking surface that is substantially imperforate where the hinging means permits the unit to lie generally flush or only slightly above the cooking surface.

A further object of the present invention is to provide a hinging means of the class described made of long wearing parts of metal, ceramic or plastic which are capable of withstanding high temperatures and preventing liquids from draining through the hinging means and into the area beneath the cooking surface.

A further object of the present invention is to provide a liquid-tight hinging means for a surface unit with a radial hinge arm that elongates as the surface unit is raised from a normal horizontal position to a substantially vertical position so that the cooking surface does not interfere with the pivotal action of the unit.

A further object of the present invention is to provide a liquid-tight hinging means for a surface heating unit of an electric cooking appliance utilizing a variable-length connecting means between the hinging means and the heating unit so as to prevent obstructing the free pivotal movement of the heating unit.

A still further object of the present invention is to provide a fluid-tight drum type hinging means for a surface heating unit with a simplified support means for the drum.

The present invention, in accordance with one form thereof, relates to an electric surface heating unit that is positioned within a recess formed in a horizontal cooking surface. The recess is preferably imperforate except for a lateral opening in the side wall thereof for receiving the terminals of the heating element therethrough. A hinge means is provided for the heating unit so that it may be pivoted from a normal horizontal position to a substantially vertical position for ease in cleaning the recess. It is desirable that this lateral opening for the heating element terminals be sealed at all time in all positions of the surface unit thus preventing spilled food and liquids from accumulating beneath the cooking surface.

One successful method for sealing the lateral opening is to use a diaphragm or sealing gasket of elastomeric material but they are degraded by the high temperatures which tend to shorten the life of the rubber material. The hinging means of the present invention is of metal, ceramic or high temperature plastic and it comprises a hinge plate fastened over the lateral opening and having an elongated hole which supports a close-fitting horizontally rotatable drum. The terminals of the heating element are sealed in an elongated sleeve member which in turn extends through an elongated aperture in the drum in a close-fitting sliding relationship. Hence, the pivotal axis of the drum forms the pivotal axis of the hinge means. A variable-length connecting means is joined between the sliding member and the hinge plate so that as the heating unit is raised from its normal horizontal position the sliding member moves in a direction away from the drum to increase the radial hinge arm so that the cooking surface does not constitute an obstruction to the free swinging movement of the heating unit into the vertical position. Several modifications are shown of means for pivotally supporting the drum from the hinge plate. In all modifications the presence of the sleeve member extending through the drum constitutes an obstruction to the disassembly of the drum. Thus, it is necessary to withdraw the sleeve member from the drum before the drum can be separated from the hinge plate.

Our invention will be better understood from the following description taken in conjunction with the accompanying drawing and its scope will be pointed out in the appended claims.

FIGURE 1 is a cross-sectional elevation view taken through the center of a surface heating unit embodying the first modification of the hinging means of the present invention and showing the unit in its normal horizontal position;

FIGURE 2 is a cross-sectional elevational view similar to that of FIGURE 1 with the heating unit pivoted to a substantially vertical position and showing the manner in which a cam action causes the hinge means to extend the heating unit as the unit is pivoted so as to avoid interference with the cooking surface;

FIGURE 3 is a fragmentary plan view of the hinging means taken on the line 3—3 of FIGURE 1;

FIGURE 4 is a fragmentary cross-sectional elevational view of the bearing means for the rotatable drum within the hinge plate as is taken on the line 4—4 of FIGURE 3;

FIGURE 5 is a fragmentary view similar to that of FIGURE 4 showing the bearing in the hinge plate but with the drum removed;

FIGURE 6 is a perspective view of the drum which is rotatably mounted in the hinge plate and is adapted to receive the sliding member that is sealed around the terminals of the heating element;

Figure 7:
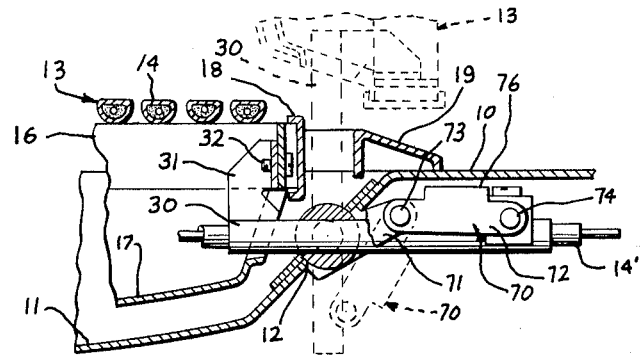
FIGURE 7 is a fragmentary cross-sectional elevational view of a second modification of a fluid-tight hinging means according to the present invention using a knee-action lever mechanism.

Turning now to a consideration of the drawing and in particular to FIGURE 1, there is shown a horizontal cooking surface 10 having a circular recess or cavity 11 in its top surface which is substantially imperforate except for a lateral opening 12 in one side of the recess for receiving the terminals of a heating element therethrough. Supported across the top surface of the recess is a surface heating unit 13 that comprises a resistance heating element 14 having a metal sheath 15 that forms a jacket around an inner helical coil of resistance wire such as Nichrome that is packed in a suitable thermal insulating material such as magnesium oxide as is standard in this art. The heating element 14 is wound in a flat coil and supported on a spider or framework 16 formed by intersecting metal strips which underlie the coil. The usual construction is to provide the top edge of each metal strip with a plurality of shallow slots which receive the turns of the metal sheathed element therein. The heating element is lightly crimped in place within the slots so as to prevent displacement of the unit from the slot while allowing a certain amount of expansion and contraction during the temperature changes of the element. Fastened beneath the heating element 14 is a reflector pan 17 that is held in place by a support ring 18 which encircles the spider 16 and is in telescopic relation with the top edge of the reflector pan. Suitable fastening means (not shown) are connected between the support ring and the reflector pan for forming a subassembly of a heating unit comprising a resistance element 14, spider 16, reflector pan 17, and support ring 18. Finally, a removable trim ring 19 is slipped over the surface unit and around the support ring 18 to form a decorative trim member which will close the gap that exists between the surface unit and the upper edge of the recess 11.

The heating unit 13 is supported over the recess 11 by a hinge means 25 and one or more support tabs 26 spaced around the periphery of the unit remote from the hinge means 25. The support tab 26 is shown as a spring member that is supported beneath the edge of the reflector pan 17 by means of bracket 27. The bottom portion of the tab 26 includes a hairpin spring portion 28 that bears against the side wall of the recess 11 for centering the heating unit therein.

The heating element 14 is shown as having four terminals 14' with three terminations for a double heating coil and a common ground connection as is shown, although it should be understood that there might be two terminals for a single heating coil. One element of the hinge means 25 includes a sliding member 30 of flattened tubular shape which encompasses the terminals 14' and is supported by a bracket member 31 that extends down from the underside of the spider 16.

A second important member of the hinge means 25 is a hinge plate 33 that is fastened over the lateral opening 12 in a side wall recess such as by means of fastening screws 34 shown in FIGURE 3. The hinge plate 33 includes an elongated rectangular hole 35 in which is supported a close-fitting rotatable drum 36 which turns about a horizontal longitudinal axis lying substantially in the plane of the hinge plate 33. A transverse elongated aperture 37 is formed in the drum to receive the sleeve member 30 in a close-fitting relationship as is best seen in FIGURE 1. A suitable thin lubricant is applied over the outer surface of the sleeve member 30 to assist in the ease of movement through the drum and also to retard the leakage of any liquid therethrough.

An ingenious bearing means 40 of FIGURE 5 is employed to assemble the ends of the drum 36 with the hinge plate 33. The bearing 40 includes a vertical end wall 41 at each end of the elongated slot 35. Each end wall includes an inwardly directed pivot pin 42 having a central axis that lies substantially in the plane of the hinge plate 33. A semi-circular hub 43 extends around the top edge of the end wall 41 and it is radially spaced from the pivot pin 42 as the center of its axis of rotation. It should be noted that the pivot pin 42 is exposed from the underside of the hinge plate 33. Now looking at FIGURE 6, each end of the rotatable drum 36 is provided with a C-shaped trunnion member 45 that has a central portion 46 that is adapted to encompass the pivot pin 42 as is best seen in FIGURE 4 when the trunnion 45 is slipped under the pin and the back side of the hinge plate and the drum is rotated approximately 180° to assume the position of FIGURE 4. It should be understood that this view of FIGURE 4 is the one when the sleeve member 30 is in its normal horizontal position of FIGURE 1 as is represented by the dotted lines. Then the sleeve member 30 is inserted through the elongated aperture 37 in the drum which limits the amount of rotation of the drum to about 90° as can be visualized by comparing FIGURES 1 and 2. This angular limitation prevents the drum from being reversed 180° which is necessary in order to disconnect the drum from the pivot pins 42.

It is desirable to have the top surface of the heating until 13 nearly flush with the top of the cooking surface 10. This is considered from an appearance standpoint as well as for ease in sliding the cooking utensil off the surface unit and onto the cooking surface for cooling the food before serving. This complicates the design of the hinging system somewhat in that a special provision must be made for preventing interference by the cooking surface of the pivotal movement of the surface unit as the unit is raised from a normal horizontal position to the substantially vertical position. This difficulty is circumvented in the present invention by providing means for extending the sleeve member 30 in a direction away from the drum as the unit is raised from a horizontal to a vertical position and vice versa. In other words, the radial hinge arm of the surface unit increases in length as the surface unit is raised and decreases in length as the unit is lowered into the recess so the unit is positioned centrally in the recess when in its horizontal position.

This radial adjustment is provided by a cam track and follower means 50 formed as part of the hinge means, where the hinge plate 33 supports a parallel pair of cam tracks 51 serving one at each side of the sliding member 30 as is best seen in FIGURE 3. The distal end of the sleeve member 30 includes a pair of oppositely directed cam followers or pins 52 on the sides thereof which cooperate with the cam tracks 51 and are guided thereby. The cam track 51 is of generally arcuate shape that is concave upwardly with an upper end 53 that is generally in line with a horizontal line drawn through the center of the drum 36 as is best seen in FIGURE 1. The lower extremity of each cam track 51 is provided with a detent portion 54 that serves to support the surface unit 13 in a substantially vertical position as is best understood from FIGURE 2. In other words, the cam track 51 provides positive stop means at the top and bottom thereof for defining both the vertical and horizontal positions of the surface unit so that the surface unit need not be manually supported in the vertical position while the recess 11 is being cleaned.

Figure 9:
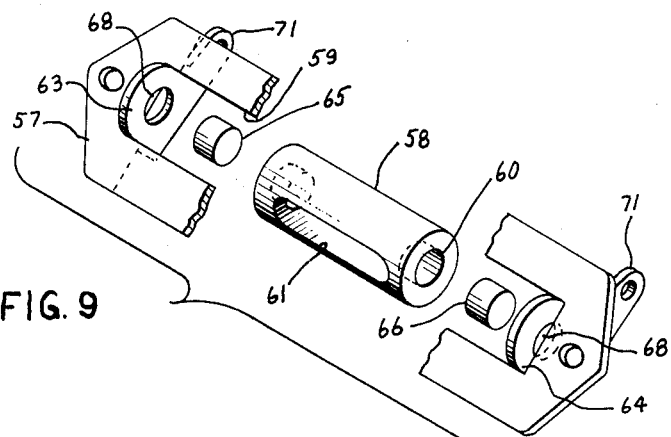
FIGURE 9 is an exploded view of the combined hinge plate and drum member of this invention depicting the means for rotatably supporting the drum in the hinge plate in a close-fitting relationship.
Figure 8:
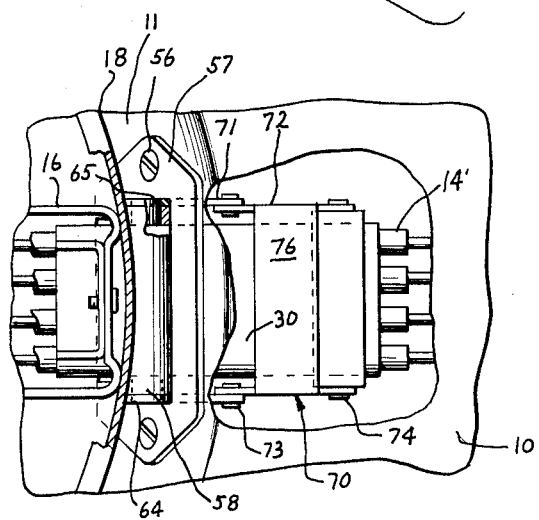
FIGURE 8 is a fragmentary plan view of the hinging means of FIGURE 7 showing the symmetrical nature of the knee-action lever mechanism.

The second modification of this hinge invention is shown in FIGURES 7–9. Like elements in both modifications are given the same reference numerals. For example, in FIGURE 7 there is the horizontal cooking surface 10 having the circular recess or cavity 11 which is substantially imperforate except for a lateral opening 12 in one side of the recess for receiving the terminals 14' of a coiled heating element 14 that represents a standard surface heating unit 13 of an electric range or hotplate. The heating element is supported on a spider or open framework 16 which in turn is suspended across the top of a shallow reflector pan 17. This assembly is held together by a crimped support ring 18 that encircles the spider 16 and is in telescopic relation with the top edge of the reflector pan 17. Finally, a removable trim ring 19 is slipped over the surface unit 13 and around the support ring 18 to form a decorative member tending to close the gap that exists between the surface unit and the upper edge of the recess 11. The surface unit also includes the sleeve member 30 of flattened tubular shape which encompasses the four parallel terminals 14'. A suitable fluid-tight sealing means fills the interstices of the sleeve member so as to prevent the flow of any liquids therethrough. This sleeve member 30 is fixed to the surface unit 13 by being attached to a bracket member 31 that is fastened to the spider 16 by screw means 32.

A major portion of the hinge means of this second modification is illustrated in FIGURE 9 as the hinge plate 57 and cooperating rotatable drum 58. The hinge plate has an elongated rectangular hole 59 in which the drum has a close-fitting relationship as is best seen in FIGURE 7. The drum 58 is a tubular member with a circular bore 60 and a transverse elongated aperture 61 formed therethrough to receive the sleeve member 30 in a close-fitting relationship, also as seen in FIGURE 7. A suitable thin lubricant is applied over the outer surface of the sleeve for facilitating relative movement while preventing any leakage of liquids therethrough. The hinge plate 57 is adapted to be fastened over the lateral opening 12 by means of screw fasteners 56.

The means for pivoting the drum 58 to the hinge plate 57 includes a pair of vertical walls 63 and 64, one at each end of the rectangular hole 59, and a pair of supporting pins 65 and 66 for engagement in the opposite ends of the bore 60 of the drum. Each end wall 63 and 64 is permanently attached to the hinge plate and is equipped with a circular opening or journal bearing 68 that has its center axis that lies within the plane of the hinge plate 57 so as to place the longitudinal axis of rotation of the drum within the plane of the hinge plate as can be seen in FIGURE 7.

Attention is directed to the fact that each journal bearing is partially closed on the outside by the hinge plate 57. This serves to prevent the supporting pins 65 and 66 from outward movement. The pins 65 and 66 are retractable in nature and they are extended outwardly by exerting a force against the pins from within the transverse aperture 61. Each pin 65 and 66 is of such length that it normally engages the side of the sleeve 30 when the sleeve extends through the drum. In other words, the presence of the sleeve 30 within the drum holds the pins 65 and 66 in place. This requires that the sleeve 30 must be withdrawn from the drum 58 before the drum may be dismantled from the hinge plate 57.

This hinge means also requires a positive connecting link between the sleeve member 30 and the hinge plate 57. This is represented by a knee-action lever mechanism 70 as is best seen in FIGURE 7. It comprises a fixed lever 71 and a movable lever 72. This movable lever is pivoted at one end 73 to the distal end of the fixed lever, and pivoted at its opposite end 74 to the sleeve member 30. Notice that the fixed lever 71 is actually an extension of each of the vertical end walls 63 and 64 of the hinge plate. Also, the knee-action lever mechanism is symmetrical about the sleeve 30, having the fixed and movable levers 71 and 72 at both sides of the sleeve. Moreover, a strut member or strap 76 joins the two movable straps 72 together for the sake of rigidity.

The lever mechanism 70 is in a generally extended position when the surface unit 13 is in its normal horizontal position. As the surface unit is being raised about its hinge axis, the lever mechanism buckles to draw the distal end of the sleeve toward the drum as is seen in dotted lines in FIGURE 7. This procedure increases the effective radial length of the sleeve measured between the surface unit 13 and the hinge axis so as to avoid any obstruction to the free movement of the surface unit to a generally vertical position.

Modifications of this invention will occur to those skilled in this art, therefore, it is to be understood that this invention is not limited to the particular embodiments disclosed but that it is intended to cover all modifications which are within the true spirit and scope of this invention as claimed.

What we claim as new and desire to secure by Letters Patent of the United States is:

1. In an electric cooking appliance, a top cooking surface having an imperforate recess, an electric surface heating unit positioned within the recess and including a heating element, hinge means connecting the heating unit to the cooking surface, said hinge means comprising a hinge bracket fixed beneath the heating unit adjacent one side edge thereof, the hinge bracket supporting an elongated sleeve member for receiving the terminals of the heating element therethrough, a lateral opening in one side of the recess, a hinge plate fastened over the lateral opening and having an elongated hole in which is supported a close-fitting rotatable drum, the drum including an elongated aperture, the sleeve member of the heating unit extending through the elongated aperture of the drum in a close-fitting relationship, the hinge plate including cam track means serving to force the sleeve member to shift in a direction away from the drum as the drum turns within the hinge plate when the heating unit is raised from its normal horizontal position toward a substantially vertical position.

2. In an electric cooking appliance, a top cooking surface having an imperforate recess, an electric surface heating unit positioned over the recess and including a coiled metal sheathed heating element; the invention comprising hinge means connecting the heating unit to the cooking surface so as to provide a spill-proof surface that will not permit liquids or food particles to accumulate beneath the cooking surface, said hinge means comprising a hinge bracket fixed beneath the heating unit adjacent one side edge thereof, the hinge bracket supporting an elongated sleeve member for receiving the terminals of the heating element therethrough, and fluid-tight means sealing the terminals of the heating element within the sleeve member, a lateral opening in one side of the recess of the cooking surface, a hinge plate fastened over the lateral opening and having an elongated hole in which is pivotally supported on a horizontal axis a close-fitting rotatable drum for sealing the edges of the elongated hole, the drum including an elongated aperture extending transversely therethrough, the sleeve member of the heating unit extending through the elongated aperture of the drum in a close-fitting sliding relationship, and a variable-length connecting means joining the innermost end of the sleeve member to the hinge plate, said variable-length being measured with respect to the axis of rotation of the drum.

3. In an electric cooking appliance as recited in claim 2 wherein the variable-length connecting means comprises a cam track means and a pivot pin means cooperating therewith located between the distal end of the sleeve member and a portion of the hinge plate that is located beneath the cooking surface whereby the cam track means is located on one of the elements and the pivot pin means is located on the other so that when the heating unit is raised from its normal horizontal position toward a substantially vertical position the effective length of the connecting means will be shortened and the sleeve member will be caused to slide through the drum as the drum turns within the hinge plate.

4. In an electric cooking appliance, a top cooking surface having a recess therein, an electric surface heating unit positioned within the recess and including a coiled metal sheathed heating element, said hinge means comprising a hinge bracket fixed beneath the heating unit adjacent one side edge thereof, the hinge bracket supporting a sleeve member for receiving the terminals of the heating element therethrough, said sleeve member containing a fluid-tight sealing means around the terminals, a lateral opening in one side of the recess in the cooking surface, a combined hinge plate and rotating drum member fastened over the lateral opening, an elongated hole extending transversely through the drum for receiving the sleeve member therethrough in a close-fitting sliding relationship, the heating unit being capable of being raised between a normal horizontal position and a substantially vertical position when the drum is caused to rotate about a horizontal axis within the hinge plate, and a variable-length connecting means joining the innermost end of the sleeve member to the hinge plate, said variable-length being measured with respect to the axis of rotation of the drum.

5. An electric cooking appliance as recited in claim 4 where the variable-length connecting means comprises a cam track means supported from the hinge plate and located beneath the cooking surface, as well as a pivot pin means on the sleeve member cooperating with the cam track means so that when the heating unit is raised the cam track means serves to slide the sleeve member through the drum as the drum turns within the hinge plate, so that the heating unit has in effect a sliding pivot and the radius of turning of the heating element increases as the heating unit turns from its horizontal position to its substantially vertical position.

6. In an electric cooking appliance, a top cooking surface having an imperforate recess, an electric surface heating unit positioned within the recess and including a coiled metal sheathed heating element, the top surface of the heating element being substantially flush with the top of the cooking surface; the invention comprising hinge means for connecting the heating unit to the cooking surface while allowing the terminals of the heating element to extend through the hinge means so that the electrical termination of the heating element is located beneath the cooking surface, said hinge means comprising a hinge bracket fixed beneath the heating unit adjacent one side edge thereof, the hinge bracket including a sleeve member through which the terminals of the heating element extend, and means for sealing the terminals within the sleeve member, a lateral opening in one side of the recess in the cooking surface, a combined hinge plate and rotatable drum where the plate is fastened over the lateral opening, the drum includes a transverse aperture extending therethrough for receiving the sleeve member of the heating unit in a close-fitting sliding relationship and a variable-length connecting means joining the innermost end of the sleeve member to the hinge plate, said variable-length being measured with respect to the axis of rotation of the drum for increasing the radial dimension of the heating unit as the unit is raised from its normal horizontal position to a substantially vertical position so that the cooking surface does not interfere with the free-swinging of the heating unit.

7. In an electric cooking appliance as recited in claim 6 wherein the said variable-length connecting means for increasing the radial dimension of the heating unit comprises a cam truck and cam follower means connected between the hinge plate and the sleeve member.

8. A hinge means for a surface hinging unit comprising a hinge plate fixed to a supporting structure, the hinge plate having an opening for receiving a rotatable drum therein in a close-fitting relationship to turn about the longitudinal axis of the drum which lies generally within the plane of the hinge plate, a transverse opening through the drum for accommodating the terminals of a surface heating unit therethrough, said hinge plate having a bearing member at each end of the opening for receiving the drum, each bearing member including an end wall with a central pivot means and a semi-circular hub centered therearound and located on the front side of the hinge plate, each end of the said rotatable drum including a C-shaped trunnion member which slips over the pivot means in the bearing member, the drum being turned through about 180° for aligning the transverse opening through the drum along a horizontal line.

9. A hinging means for a surface heating unit comprising a hinge plate fixed to a supporting structure, the hinge plate having an opening for receiving a rotatable drum therein in a close-fitting relationship to turn about the longitudinal axis of the drum which lies generally within the plane of the hinge plate, a transverse opening through the drum for accommodating the terminals of a surface heating unit therethrough, said hinge plate including a bearing wall adjacent each end of the opening for receiving the drum, each end of the drum having trunnion means for quick-connect assembly with the adjacent bearing wall, and a surface heating unit with a resistance heating element having terminals fitted into a sleeve member that is inserted through the transverse opening through the drum, the assembly of the drum in the hinge plate being insured by the presence of the sliding member in the drum, so that the sliding member must be removed to disassembly the drum from the hinge plate.

10. In an electric cooking appliance, a top cooking surface having an imperforate recess, an electric surface heating unit positioned over the recess and including a coiled metal sheathed heating element; the invention comprising hinge means connecting the heating unit to the cooking surface so as to provide a spill-proof surface that will not permit liquids or food particles to accumulate beneath the cooking surface, said hinge means including a hinge bracket fixed beneath the heating unit adjacent one side edge thereof, the hinge bracket supporting an elongated sleeve member for receiving the terminals of the heating element therethrough, and fluid-tight means sealing the terminals of the heating element within the sleeve member, a lateral opening in one side of the recess of the cooking surface, a hinge plate fastened over the lateral opening having an elongated hole in which is supported on a horizontal axis a close-fitting rotatable drum for sealing the edges of the elongated hole, the drum including an elongated aperture extending transversely therethrough, the sleeve member of the heating unit extending through the elongated aperture of the drum in a close-fitting sliding relationship, and a pivoted knee-action lever mechanism connecting the hinge plate with the distal end of the sleeve member so as to control the relative position of the sleeve member with respect to the drum as the heating unit is being raised or lowered with respect to the said cooking surface.

11. In an electric cooking appliance, a top cooking surface having a recess therein, an electric surface heating unit positioned within the recess and including a coiled metal sheathed heating element, said hinge means comprising a hinge bracket fixed beneath the heating unit adjacent one side edge thereof, the hinge bracket supporting a flattened sleeve member for receiving the terminals of the heating element therethrough, said sleeve member containing a fluid-tight sealing means around the terminals, a lateral opening in one side of the recess in the cooking surface, a combined hinge plate and rotating drum member fastened over the lateral opening, an elongated hole extending transversely through the drum for receiving the sleeve member therethrough in a close-fitting sliding relationship, the heating unit being capable of being raised between a normal horizontal position and a substantially vertical position when the drum is caused to rotate about a horizontal axis within the hinge plate, and a knee-action lever mechanism joining the sleeve member to the hinge plate to prevent the separation thereof and control the relative movement therebetween.

12. An electric cooking appliance as recited in claim 11 wherein the knee-action lever mechanism comprises at least one fixed lever on the underside of the hinge plate and at least one movable lever pivotally connected at one end to the fixed lever and pivotally connected at the other end to the distal end of the sleeve member, said lever mechanism being in a generally extended position when the heating unit is in its normal horizontal position, said lever mechanism moving toward a folded position when the heating unit is pivoted toward a generally vertical position.

13. An electric cooking appliance as recited in claim 12 wherein the said lever mechanism comprises a pair of linkages, there being one linkage at each side of the sleeve member, and a strut member connecting the two movable levers of the mechanism for providing straight-line movement between the sleeve member and the drum member.

14. A hinging means for a surface heating unit comprising a hinge plate fixed to a supporting structure, the hinge plate having an elongated opening for receiving a rotatable drum therein in a close-fitting relationship to turn about the longitudinal axis of the drum which lies generally within the plane of the hinge plate, a journal bearing positioned at each end of the elongated opening, the drum having a circular socket at each end, and a supporting pin at each end of the drum partially seated in the journal bearing and partially seated in the drum socket, a transverse opening through the drum for accommodating the terminals of a surface heating unit therethrough as well as for exposing the drum sockets for ease of assembly of the supporting pin, the terminals of the surface heating unit being adapted to hold the supporting pins from disassembly.

15. In an electric cooking appliance, a top cooking surface having a recess therein, an electric surface heating unit positioned within the recess and including a coiled metal sheathed heating element, said hinge means comprising a hinge bracket fixed beneath the heating unit adjacent one side edge thereof, the hinge bracket supporting a flattened sleeve member for receiving the terminals of the heating element therethrough, said sleeve member containing a fluid-tight sealing means around the terminals, a lateral opening in one side of the recess in the cooking surface, a combined hinge plate and rotating drum member fastened over the lateral opening, said hinge plate having an elongated opening receiving the rotatable drum in a close-fitting relationship, a vertical wall formed at each end of the elongated opening, a circular opening in each wall where the opening has a central axis lying generally within the plane of the hinge plate, the drum having a retractable supporting pin at each end for engagement within the adjacent wall opening, an elongated hole extending transversely through the drum for receiving the sleeve member therethrough in a close-fitting sliding relationship, the presence of the sleeve member within the drum serving to prevent the retraction of the supporting pins and hence the disassembly of the hinge means, the heating unit being capable of being raised between a normal horizontal position and a substantially vertical position when the drum is caused to rotate about a horizontal axis within the hinge plate.

16. In an electric cooking appliance as recited in claim 15 with the addition of a knee-action lever mechanism joining the sleeve member to the hinge plate to prevent the separation thereof and control the relative movement therebetween.

References Cited by the Applicant

UNITED STATES PATENTS 2,624,827    1/1953    Young.
2,802,927    8/1957    Covert.

OTHER REFERENCES

Voigt: German Application No. 1,027,860, printed Apr. 10, 1958.

RICHARD M. WOOD, *Primary Examiner.*